United States Patent

[11] 3,590,780

[72] Inventor Charles C. Dunbar
62 Bowdoin St., Portland, Maine 04102
[21] Appl. No. 885,468
[22] Filed Dec. 16, 1969
[45] Patented July 6, 1971

[54] BIRD FEEDER
5 Claims, 4 Drawing Figs.
[52] U.S. Cl. ................................................... 119/51
[51] Int. Cl. ................................................... A01k 05/00
[50] Field of Search ........................................... 119/51, 52, 61, 63, 23

[56] References Cited
UNITED STATES PATENTS
2,344,367  3/1944  Pueschel ..................... 119/52 R
2,891,508  6/1959  Bower ......................... 119/51 R
3,515,098  6/1970  Thurmond ..................... 119/51 R Primary Examiner—Hugh R. Chamblee
Attorney—Kenyon and Kenyon Reilly Carr and Chapin ABSTRACT: A bird feeder providing protection against theft of bird feed by squirrels is disclosed which comprises in combination a feeding device having a feeding zone accessible to birds and a drum-shaped guard presenting an at least approximately cylindrical vertical surface at least approximately 6 inches in diameter and at least approximately 18 inches in length. Means is provided which suspends the feeding device below the guard with the center of the feeding device substantially in alignment with the projected axis of the guard and with the uppermost portion of the feeding device spaced from the lowermost portion of the guard by a distance not greater than about the diameter of the guard, the spacing of the outermost extremity of the feeding device radially from the projected axis of the guard being not more than approximately 1 inch greater than that of the portion of the peripheral surface of the guard in vertical alignment therewith. And means is provided for preventing the passage of a squirrel through the interior of the guard and for suspending the guard from a support.

PATENTED JUL 6 1971
3,590,780
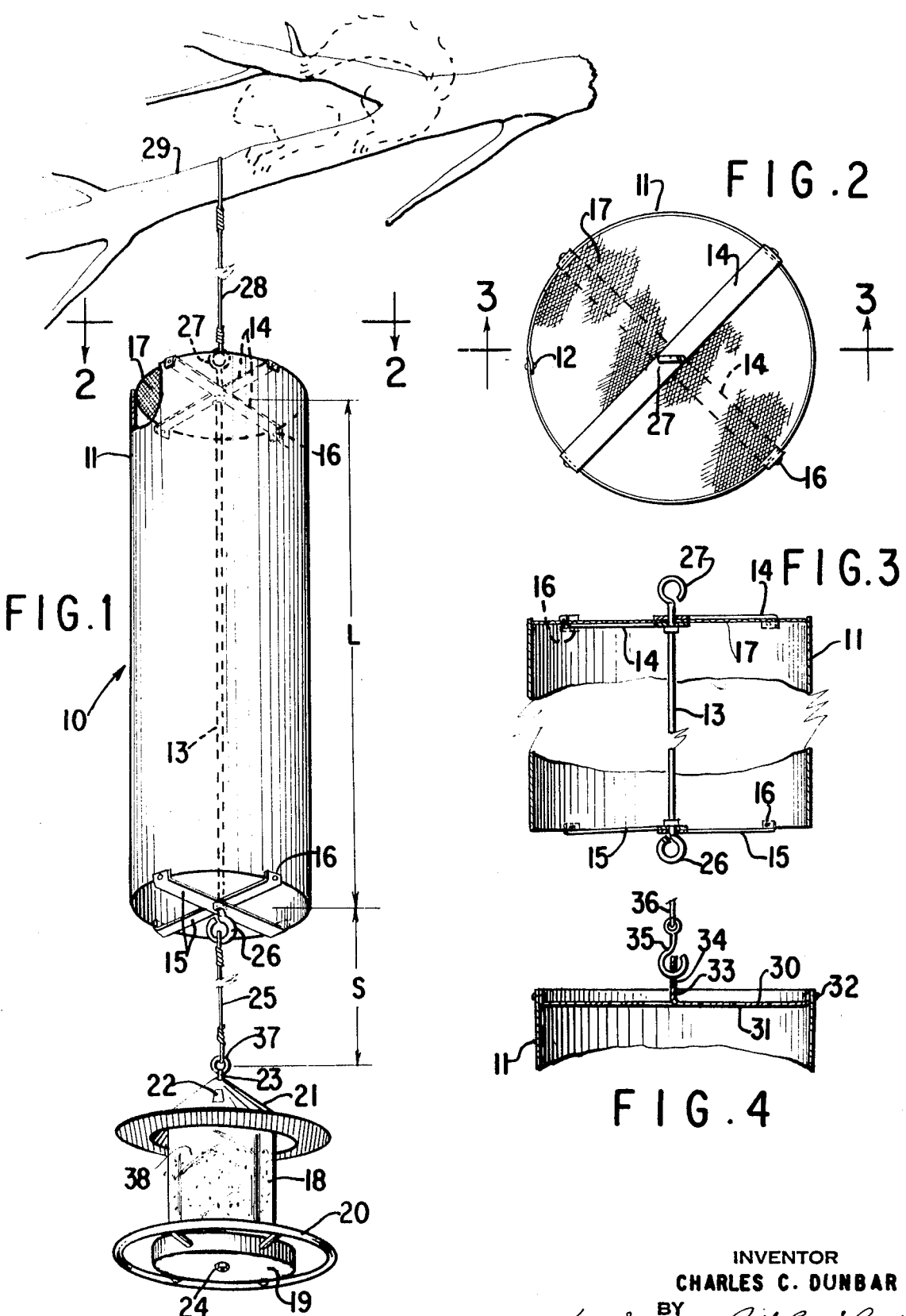
INVENTOR
CHARLES C. DUNBAR
BY
Kenyon & Kenyon Reilly Carr & Chapin
ATTORNEYS

BIRD FEEDER

DISCLOSURE OF INVENTION

Field of Invention

This invention relates to bird feeders and relates more especially to a suspendable bird feeder comprising means for preventing squirrels from stealing food intended for birds.

Background of the Invention

The feeding of birds is a hobby which has become very popular in recent years. In order to provide a container for bird food many different types of feeding device have been sold most of which involve the provision of a small bin for sunflower or other bird seed and a feeding zone into which the seed flows as it is used up, which feeding zone is accessible to birds and usually has a perch adjacent thereto. Some bird feeders are supported from below by a post. On the other hand, many bird feeders are suspended by wire or other strand from above. Generally speaking, any locality frequented by birds also is frequented by squirrels. The squirrels constantly are in search of food and have an instinct for locating and stealing bird food from bird feeders. Moreover, squirrels have such persistent ingenuity combined with extreme agility that they find some way of gaining access to the food in a bird feeder. This is a source of great annoyance since a squirrel can consume most of the food in a bird feeder in a very short time, with the result that the bird feeder can no longer serve its intended purpose. There have been many proposals for minimizing theft from bird feeders by squirrels but they have not proven to be particularly successful.

General Statement of Invention

It is an object of this invention to provide a suspendable bird feeder which effectively safeguards the bird food in a feeding device from the theft of food therefrom by squirrels.

The object of this invention is obtained by combining a feeding device having a feeding zone accessible to birds with a drum-shaped guard presenting an at least approximately cylindrical vertically disposed surface at least approximately 6 inches in diameter and at least approximately 18 inches in length, the guard being disposed above the feeding device and means being provided for suspending the feeding device from below the guard with the center of the feeding device substantially in alignment with the projected axis of the guard and with the uppermost portion of the feeding device spaced from the lowermost portion of the guard by a distance not greater than about the diameter of the guard. Moreover, the outermost extremity of the feeding device radially from the projected vertical axis of the guard is not more than approximately one inch greater than that of the portion of the peripheral surface of the guard in vertical alignment therewith. Means such as a cord is provided for suspending the guard from a support and a shield member is in secured relation to the guard that is adapted and arranged to prevent the passage of a squirrel through the interior of the guard. Preferably an elongated load-carrying member is disposed substantially along the vertical axis of the guard and means is provided for maintaining the guard in fixed vertical and radial position with respect to the elongated load-carrying member. In such case, the means for supporting the feeding device is suspended by and from the load-carrying member. Moreover, the load-carrying member adjacent the upper end thereof is suspended by and from the means for supporting the guard.

In actual demonstration the bird feeder combination described above has proved to be extremely effective in preventing squirrels from having access to the food in the bird feeder. Most ordinary suspending cords are such that a squirrel can manage to slide down the suspending cord. However, when the bird feeder is in accordance with the present invention a squirrel attempting to slide down the cord is stopped by the guard. If the suspending cord were protected by a disc or the like, such an expedient provides little in the way of an obstacle to the ingenuity of squirrels, for a squirrel intent on obtaining bird food will resort to expedients such as hanging by the rear feet while reaching for something to grasp therebelow or will drop or jump in such a way as to gain a foothold on the feeding device itself. When the combination of this invention is employed such acrobatics have been found to be frustrated. The guard is such that a squirrel cannot gain his objective by hanging from the upper margin of the guard. Moreover, the squirrel cannot get a grip on the guard. In addition, if the squirrel attempts to swing the supported bird feeder back and forth so as to provide an opportunity to jump from above and land on the feeding device, this maneuver also has been found to be frustrated.

DETAILED DESCRIPTION OF THE INVENTION

Further objects, features and advantages of this invention will become apparent in connection with the following description in connection with the drawings of certain preferred embodiments of this invention for purposes of illustrating the practice thereof.

FIG. 1 is a perspective view of the assembled bird feeder suspended from a support;

FIG. 2 is a plan view of the top of the guard portion of the bird feeder at the line 2-2 of FIG. 1;

FIG. 3 is a vertical section through the center of the guard on the line 3-3 of FIG. 1 with the central portion thereof broken away; and FIG. 4 is a cross-sectional elevation of the upper portion of an alternate form of guard construction.

Referring to the embodiment shown in FIGS. 1, 2 and 3, the drum-shaped guard is indicated generally by the reference character 10. The principal component of the guard is the cylindrically shaped part 11 which is referred to hereinafter as the "cylinder" and which preferably and conveniently may be formed by bending a piece of sheet aluminum so as to provide a substantially cylindrical peripheral surface. The vertically disposed overlapping edges of the sheet aluminum may be secured to each other as by rivets 12. The cylinder 11 is at least about 6 inches in diameter. The diameter of the cylinder 11 may be larger, its diameter in large measure being dictated by the size of the feeding device comprised in the bird feeder. For example, if the diameter of the cylinder 11 is 6 inches, the diameter of a feeding device such as that shown should be not more than about 8 inches. If the diameter of the feeding device is about 12 inches, then the diameter of the cylinder should be at least about 10 inches, as will be described below. The length "L" of the cylinder is at least about 18 inches in length and may be longer.

An elongated load-carrying member 13 is disposed substantially at the axis of the cylinder 11 and protrudes from opposite ends thereof. The cylinder is held in fixed radial and vertical position relative to the load-carrying member 13 by the straps 14 disposed at right angles to each other at the upper end of the cylinder 11 and by similarly disposed crossed straps 15 at the lower end of the cylinder 11. The straps 14 and 15 may be secured to the cylinder 11 in any suitable way as by the use of rivets 16 which secure the turned ends of the straps to cylinder. The elongated load-carrying member 13 passes through holes in the crossed straps 14 and 15, which holes are disposed substantially at the vertical axis of the cylinder 11 and determine the radial disposition of the cylinder relatively to the member 13. The vertical position of the cylinder may conveniently be fixed by resting straps 15 on the eye 26 formed integrally with the lower end of the member 13. A wire mesh screen 17 is disposed the the upper end of the cylinder 11 and, as shown in FIGS. 1 and 2, it is held in position by having one of the straps 14 above the wire mesh screen and the other strap 14 disposed underneath the wire mesh screen. The screen 17 constitutes a shield member to prevent a squirrel from attempting to pass through the interior of the cylinder 11 in its efforts to reach the feeding device.

The feeding device shown in FIG. 1 may be of any desired conventional type. That shown in FIG. 1 is a simple and relatively inexpensive feeding device that has been found to be effective in attracting and feeding birds. In this particular device the magazine for the food 38 is indicated by the reference character 18. The lower end of the magazine terminates and is held so as to be a short distance above the tray 19, which is of somewhat greater diameter than the magazine 18 and receives feed from the magazine so as to be accessible to birds to the extent that the feed is consumed by birds. The perch 20 is provided on which a bird may perch and from which a bird has access to the bird food in the tray 19 in the region where the tray 19 has greater diameter than the magazine 18. A roof 21 is provided to protect the food in the magazine 18 from the weather and a removable port 22 may be provided therein for the introduction of fresh supplies of bird food into the magazine. A rod 23 passing through the center of the feeder and extending slightly from the bottom thereof holds the assembly together by some suitable means such as a nut 24 threaded to the lower end of the rod. 23. The upper end of the rod 23 is provided with an eye 37 and a strand such as a cord or wire 25 is attached to the eye 37 and likewise to the eye 26 at the lower end of the elongated load-carrying member 13. While a specific type of feeding device has been shown for purposes of illustration, it is apparent that other devices may be employed and that other bird foods, for example suet, may be used instead of seed.

In order that the combination of the guard and the feeding device may be effective against squirrels, the uppermost portion of the feeding device is spaced from the lowermost portion of the guard by a distance "S" not greater than about the diameter of the guard. Moreover, the outermost extremity of the feeding device from the radially projected axis of the guard should not be more than approximately one inch greater than that of the portion of the peripheral surface of the guard in vertical alignment therewith. These limitations have been determined to be important to the effectiveness of the bird feeder combination in preventing squirrels from getting to the feeding device itself. Squirrels have been observed to start a suspended bird feeder swinging so as to gain access to the feeder by suitably timing a jump. However, when the dimensions are as aforesaid, including the length and diameter of the cylinder, the spacing of the feeding device from the lower portion of the cylinder and the diameter of the feeding device in relation to the diameter of the cylinder, the bird feeder has been found to effectively frustrate the ingenuity and agility of squirrels.

At the upper end of the elongated load-carrying member 13 there is an eye 27 to which the lower end of a wire, cord or other strand 28 is attached. The upper end of the strand 28 may be attached from any suitable support such as the tree limb 29 shown in FIG. 1.

In FIG. 4 an alternative drum construction is shown. The cylinder 11 may be has hereinabove described. However, at the upper end thereof there is shown a sheet 30 of metal which may have perforations 31 therein and which may be secured to the upper margin of the cylinder 11 by the rivets 32. In the central portion of the sheet 30 there is an upturned ear 33 having the aperture 34 therein through which the hook 35 may be passed as suspended from the cord 36. In this embodiment the sheet 30 which serves as a shield member to prevent squirrels from passing through the cylinder 11 is of sufficient strength to support the cylinder and the feeding device below the cylinder without the employment of the elongated load-carrying member 13 as shown in FIGS. 1—3. However, in the practice of this invention it is much preferred to employ the elongated load-carrying member extending end to end of the drum at substantially the axis of the drum. When the upper end of the drum is fashioned as shown in FIG. 4, the lower end of the drum may be of like construction.

I claim:

1. A suspendable bird feeder comprising in combination a feeding device having a feeding zone accessible to birds, a drum-shaped guard presenting an at least approximately cylindrical vertically disposed surface at least approximately 6 inches in diameter and at least approximately 18 inches in length, means for suspending said feeding device from and below said guard with the center of said feeding device substantially in alignment with the projected axis of said guard and with the uppermost portion of said feeding device spaced from the lowermost portion of said guard by a distance not greater than about the diameter of said guard, the spacing of the outermost extremity of said feeding device radially from said projected vertical axis of said guard not being more than approximately one inch greater than that of the portion of the peripheral surface of said guard in vertical alignment therewith, means for suspending said guard member from a support thereabove and a shield member in secured relation to said guard adapted and arranged to prevent the passage of a squirrel through the interior of said guard.

2. A suspendable bird feeder according to claim 1 wherein said means for suspending said guard from a support thereabove comprises a member adapted for the securement of a supporting strand thereto and means for fixedly maintaining said member adjacent the uppermost end of said guard substantially in alignment with the vertical axis of said guard.

3. A suspendable bird feeder according to claim 1 which comprises an elongated load-carrying member disposed substantially along the vertical axis of said guard, and means for maintaining said guard in fixed vertical and radial position with respect to said elongated member, said means for supporting said feeding device being suspended by and from said load-carrying member adjacent the lower end thereof and said load-carrying member adjacent the upper end thereof being suspended by and from said means for supporting said guard.

4. For use in the suspending means for a suspended bird feeding device, a drum-shaped guard presenting an at least approximately cylindrical peripheral surface at least approximately 6 inches in diameter and at least approximately 18 inches in length, means for preventing passage of a squirrel longitudinally through the interior of said cylinder, a member adjacent each end of said cylinder adapted for the securement of a suspending strand thereto, and means for maintaining said members in fixed position relative to said cylindrical surface substantially in alignment with the longitudinal axis of said cylinder.

5. A guard according to claim 4 in which said guard is hollow and which comprises an elongated load-bearing member disposed substantially along the longitudinal axis of said cylinder having its opposite ends connected, respectively, to said members.